(12) United States Patent
Usuda et al.

(10) Patent No.: US 6,437,314 B1
(45) Date of Patent: Aug. 20, 2002

(54) COORDINATE INPUT PEN, AND ELECTRONIC BOARD, COORDINATE INPUT SYSTEM AND ELECTRONIC BOARD SYSTEM USING THE COORDINATE INPUT PEN

(75) Inventors: Yutaka Usuda, Kanagawa; Ichirou Takeuchi, Saitama; Sueo Amemiya, Tokyo; Jun Namiki, Tokyo; Naoki Miyauchi, Tokyo, all of (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 0 days.

(21) Appl. No.: 09/318,380

(22) Filed: May 26, 1999

(30) Foreign Application Priority Data

Mar. 31, 1999 (JP) ............................. 11-092918

(51) Int. Cl.$^7$ ................................................ G06M 7/00
(52) U.S. Cl. ..................... 250/221; 345/179; 178/19.05
(58) Field of Search ........................... 250/221, 559.29, 250/559.38; 341/5; 178/18.09, 19.05, 18.01, 18.11; 345/173, 175, 179; 356/375, 3.1

(56) References Cited

U.S. PATENT DOCUMENTS

| | | | | |
|---|---|---|---|---|
| 5,294,792 A | * | 3/1994 | Lewis et al. ................. 250/221 |
| 5,500,492 A | | 3/1996 | Kobayashi et al. ....... 178/18.04 |
| 5,502,803 A | | 3/1996 | Yoshida et al. ............. 707/530 |
| 5,513,278 A | | 4/1996 | Hashizume et al. ........ 382/187 |
| 5,561,447 A | | 10/1996 | Suzuki et al. ............... 345/179 |
| 5,565,893 A | | 10/1996 | Sato et al. .................. 345/177 |
| 5,576,502 A | | 11/1996 | Fukushima et al. ....... 73/862.68 |
| 5,583,543 A | | 12/1996 | Takahashi et al. .......... 345/173 |
| 5,594,215 A | | 1/1997 | Jeng ........................ 178/18.07 |
| 5,644,653 A | | 7/1997 | Sunakawa et al. .......... 382/18.7 |
| 5,698,822 A | | 12/1997 | Haneda et al. ........... 178/18.01 |
| 5,706,028 A | | 1/1998 | Murakami et al. .......... 345/157 |
| 5,736,979 A | | 4/1998 | Kobayashi et al. ......... 345/177 |
| 5,744,760 A | | 4/1998 | Kobayashi et al. ...... 178/19.02 |
| 5,790,106 A | | 8/1998 | Hirano et al. ............... 345/173 |
| 5,818,429 A | | 10/1998 | Tanaka et al. .............. 345/173 |
| 5,854,448 A | | 12/1998 | Nozaki et al. ........... 178/18.01 |
| 5,864,098 A | | 1/1999 | Shinohe .................... 178/19.01 |
| 5,903,667 A | | 5/1999 | Kuzunuki et al. .......... 382/187 |
| 5,995,084 A | | 11/1999 | Chan et al. ................. 345/173 |
| 5,999,170 A | | 12/1999 | Ooura et al. ................ 345/179 |
| 5,999,892 A | | 12/1999 | Fan ............................. 702/158 |
| 6,061,051 A | | 5/2000 | Chan et al. ................. 345/173 |
| 6,088,481 A | | 7/2000 | Okamoto et al. ........... 382/189 |
| 6,100,538 A | * | 8/2000 | Ogawa .................... 250/559.29 |
| 6,100,876 A | | 8/2000 | Tanaka ....................... 345/173 |
| 6,118,889 A | | 9/2000 | Izuno et al. ................ 382/119 |
| 6,140,999 A | | 10/2000 | Yamada ...................... 345/173 |
| 6,208,330 B1 | | 3/2001 | Hasegawa et al. .......... 345/173 |

* cited by examiner

*Primary Examiner*—Que T. Luu
*Assistant Examiner*—Thanh X. Lun
(74) *Attorney, Agent, or Firm*—Fish & Richardson P.C.

(57) ABSTRACT

The present invention relates to a coordinate input pen for specifying and outputting coordinates of the pen by detecting two infrared beams that are emitted from two separate positions for pivotally scanning over a plane parallel to a surface of a display panel. The coordinate input pen includes: a shaft portion; a transparent conical light scattering member with a rough surface, which is, placed at the end of the shaft portion; and a light receiving element for detecting an infrared beam scattered within the light scattering member.

18 Claims, 8 Drawing Sheets

Left IR scanning beam

Right IR scanning beam

COORDINATE INPUT PEN, AND ELECTRONIC BOARD, COORDINATE INPUT SYSTEM AND ELECTRONIC BOARD SYSTEM USING THE COORDINATE INPUT PEN

FIELD OF THE INVENTION

The present invention relates to an electronic board as a device for inputting information into a computer, to a coordinate input system, and to a coordinate input pen used therewith employing an infrared (hereinafter, simply referred to as "IR") detection system.

BACKGROUND OF THE INVENTION

An electronic board is one type of devices for inputting information into a computer. Specifically, the electronic board recognizes the location or the path on the board pointed or traced by a coordinate input pen as coordinate data, based on which a display image is output from a computer and projected onto the electronic board (screen) with a front or a rear projector.

There are various electronic board systems such as an electromagnetic induction system, a laser scan system, an ultrasonic system, a pressure sensitive system and the like. According to the electromagnetic induction system, a position of a coordinate input pen is detected by sensing wires wired throughout an electronic board which detects ac (alternating current) magnetic field generated by the coordinate input pen. The laser scanning system refers to a method in which a position of a coordinate input pen is detected with IR beams scanning parallel to a surface of a board, or to a method in which two laser scanners are employed to scan a path traced with a coordinate input pen. According to the ultrasonic system, an ultrasonic pulse is oscillated by a coordinate input pen. Then, the position of the coordinate input pen is calculated based on the time lags between the actual oscillation of the ultrasonic pulse and the detection of the oscillated ultrasonic pulse by ultrasonic sensors peripherally placed around the board. According to the pressure sensitive system, a position pressed by a coordinate input pen is detected with a pressure sensitive element provided over the entire surface of the board.

Except for the laser scanning system, the above-described systems have the following problems. The electromagnetic induction system or the pressure sensitive system cannot be used with a transparent electronic board, and a large-sized electronic board incorporating these systems would be unpractical and cost mindless to produce. The pressure sensitive system does not recognize signals corresponding to those of mouse buttons (e.g., double-click and right-click signals). The ultrasonic system is limited in accuracy and is easily affected by noise.

According to the laser scanning system, two laterally provided (i.e., at right and left) laser scanners scan over a large-sized display such as a screen to acquire the position of the coordinate input pen based on light reflected off the pen. Specifically, a reflective face of the tip portion of the pen reflects the lateral laser beams. The reflected beams are then sensed and processed by the two laser scanners, thereby determining the position of the pen. Alternatively, the tip portion of the coordinate input pen is equipped with an optical sensor which directly processes the acquired beam signals to determine the position of the pen. However, according to such structures, distortion or deformation of the display panel (or the screen), a tilt of the pen upon use, or the like may interfere with accurate reflection or receiving of the laser beams. As a result, the path of the pen may not always be accurately reproduced on the display panel (or the screen).

SUMMARY OF THE INVENTION

With regard to the above-described problems, the object of the present invention is to provide a coordinate input system and a coordinate input pen employing an IR detection system, which allow steady detection of the position of the pen even under the circumstances where a display panel is distorted or deformed, or where the coordinate input pen is tilted. The present invention also aims at providing an electronic board and an electronic board system for steadily displaying the path of the coordinate input pen.

Thus, instead of employing a system where two IR scanning beams that reflected off the coordinate input pen are detected or where light is directly detected with a light-receiving element provided at the tip portion of the coordinate input pen, the present invention employs a system where IR scanning beams scatter and perpendicularly propagate within a coordinate input pen to be detected. In order to ensure the detection of the IR scanning beams, a conical IR scattering member is provided at the end of the coordinate input pen. This scattering member only detects beams that are scattered generally perpendicular to the incident direction of the beam, i.e., beams that propagates along the axis of the pen. This detecting portion of the coordinate input pen is made longer along the axis of the pen so as to allow the detection of the incident beam even if there is distortion of a display panel (e.g., a screen), tilt of the coordinate input pen, or the like, thereby enabling accurate reproduction of the path of the coordinate input pen. A part or the whole tip portion of the pen may be made to light up in response to an IR scanning beam detection signal so that the user will always know the status of IR beam detection by the coordinate input pen, rendering the pen more manageable.

In one aspect of the invention, a coordinate input pen specifies and outputs coordinates of the pen by detecting two IR beams that are emitted from two separate positions for pivotally scanning over a plane parallel to a surface of a display panel. The coordinate input pen includes: a shaft portion; a transparent conical light scattering member with a rough surface placed at the end of the shaft portion; and a light receiving element for detecting an IR beam scattered within the light scattering member. The coordinate input pen of the invention is capable of outputting coordinates even when the tip of the pen is not touching the electronic board, as long as the tip is close enough to the board to cross with the two IR scanning beams.

Preferably, the shaft portion is provided with a displaying member which visually displays the status of receiving the IR beam. This displaying member may be used to visualize the status of receiving the IR beam as either normal (where the coordinate input pen is alternately receiving the two IR scanning beams) or abnormal (where only one of the two IR scanning beams is continuously being received).

According to another embodiment, the coordinate input pen may be provided with functions of producing signals corresponding to left click, right click and double click of a mouse or signals corresponding to an enter key of a keyboard of a personal computer (hereinafter, simply referred to as a "PC"). This may be realized, for example, by providing the shaft portion of the pen with buttons having functions corresponding to such mouse buttons or such keys.

According to still another embodiment of the invention, the coordinate input pen may include a writing tool for leaving a path written on the display panel while outputting coordinates of the pen. The writing tool may be, for example, a water marker, a chalk, a pencil, or a crayon.

The coordinate input pen of the invention may be used as a coordinate input device of an electronic board employing an IR detection system. In this case, the system is designed such that signals indicating beam rotation angles of two rotary mirrors that are separately provided in the electronic board and a beam detection signal from the coordinate input pen are transmitted to a signal controller of the electronic board either wirelessly or via a wire. The signal controller processes these signals to determine the position of the coordinate input pen and renders a path of the pen to be displayed on a display panel (e.g., a screen).

In another aspect of the invention, a coordinate input system includes: a first IR scanning beam generator and a second IR scanning beam generator which alternately generate IR scanning beams; a first reference sensor for generating a first reference signal upon detecting an IR scanning beam generated by the first IR scanning beam generator; a second reference sensor for generating a second reference signal upon detecting an IR scanning beam generated by the second IR scanning beam generator; the coordinate input pen which generates a first detection signal upon detecting the first IR scanning beam from the first IR scanning beam generator, and generates a second detection signal upon detecting the second IR scanning beam from the second IR scanning beam generator; and a signal controller for receiving the first reference signal from the first reference sensor, the second reference signal from the second reference sensor and the first and the second detection signals from the coordinate input pen, thereby outputting a position coordinates signal indicating coordinates of the coordinate input pen.

The signal controller may receive the detection signals from the pen either wirelessly or via a wire. The signal controller determines an angle made by a line linking the first IR scanning beam generator and the first reference sensor with a line linking the first IR scanning beam generator and the coordinate input pen, based on the time lag between the detection of the first reference signal and that of the first detection signal. The signal controller also determines an angle made by a line linking the second IR scanning beam generator and the second reference sensor with a line linking the second IR scanning beam generator and the coordinate input pen, based on the time lag between the detection of the second reference signal and that of the second detection signal. Based on the thus-obtained two angles and the distance between the first IR scanning beam generator and the second IR scanning beam generator, the coordinates of the coordinate input pen is calculated.

In still another aspect of the invention, an electronic board of the invention includes: a display panel; first and second IR scanning beam generators which are separately placed at the periphery of the display panel and which alternately generate IR scanning beams which rotate parallel to the surface of the display panel; a first reference sensor placed at the periphery of the display panel, for generating a first reference signal upon detecting an IR scanning beam generated by the first IR scanning beam generator; a second reference sensor placed at the periphery of the display panel, for generating a second reference signal upon detecting an IR scanning beam generated by the second IR scanning beam generator; the coordinate input pen which generates a first detection signal upon detecting the first IR scanning beam from the first IR scanning beam generator, and generates a second detection signal upon detecting the second IR scanning beam from the second IR scanning beam generator; and a signal controller for receiving the first reference signal from the first reference sensor, the second reference signal from the second reference sensor, and the first and second detection signals from the coordinate input pen, thereby outputting a position coordinates signal indicating coordinates of the coordinate input pen.

An electronic board system is realized which is capable of displaying a path on the display panel traced by the coordinate input pen as if the input pen has actually drawn the path on the display panel. Such electronic board system includes: the electronic board; a computer for receiving a position coordinates signal from the signal controller of the electronic board; and an image displaying means connected to the computer for displaying a mark on the display panel at a position assigned by the position coordinates signal indicating the coordinates of the coordinate input pen. The display panel may be of any kind such as a rear-projector-type screen, a front-projector-type screen, a plasma display, a flat CRT (cathode-ray tube), or generally used whiteboard or blackboard. When a whiteboard or blackboard without an image displaying function is employed, a projector such as a rear projector or a front projector may be employed as an image displaying means for displaying a mark. A plasma display or a flat CRT with an image displaying function may serve both as a display panel and an image displaying means.

Where a coordinate input pen is integrated with a writing tool such as a water marker or a chalk, there are provided, along a side of a whiteboard or a blackboard, a pair of IR scanning beam generators for generating IR scanning beams for pivotal scanning, and a pair of reference sensors for detecting the IR scanning beams at fixed positions. By providing a signal controller which receives a coordinate input signal from the pen and outputs the coordinates of the pen, data such as characters or graphics written or drawn on the whiteboard or blackboard with the water marker or chalk (i.e., a path of the writing tool) can be easily incorporated into a computer or the like as information of consecutive coordinates. Such coordinate input pen is preferably provided with buttons or the like for determining the beginning and the end of the coordinates of the path to be incorporated.

This and other advantages of the present invention will become apparent to those skilled-in the art upon reading and understanding the following detailed description with reference to the accompanying figures.

This specification includes part or all of the contents as disclosed in the specification and/or drawings of Japanese Patent Application No. 11-92918 which is a priority document of the present invention.

DESCRIPTION OF THE PREFERRED EMBODIMENTS

Hereinafter, the present invention will be described in more details by way of examples with reference to the accompanying drawings.

Figure 1:
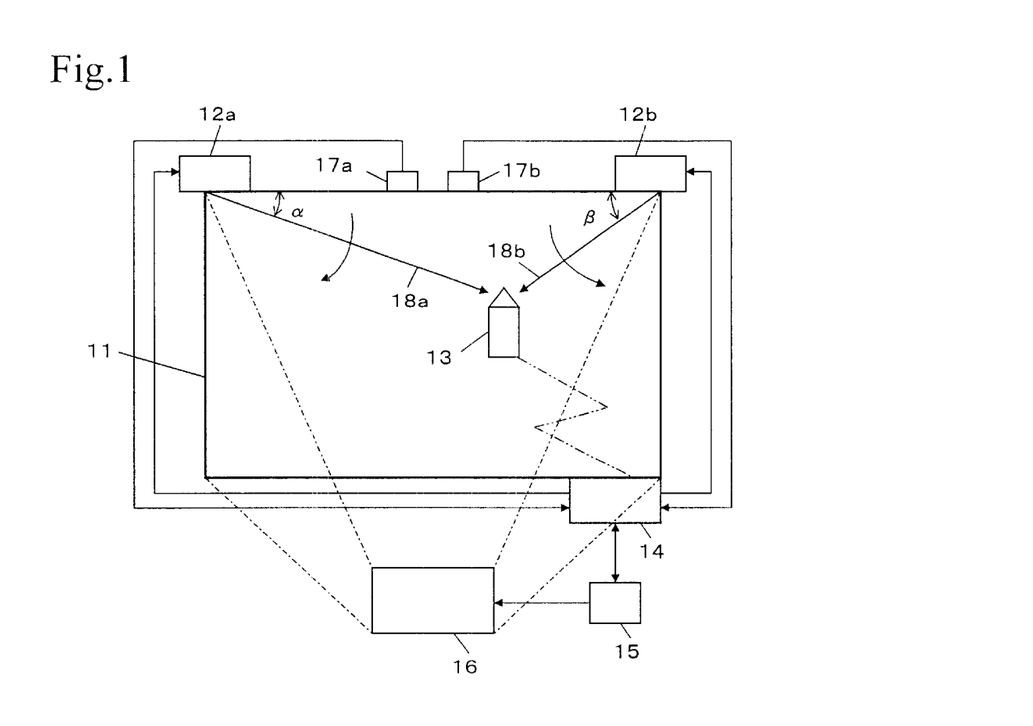
FIG. 1 is a block diagram showing an exemplary structure of an IR detection electronic board.
Figure 2:
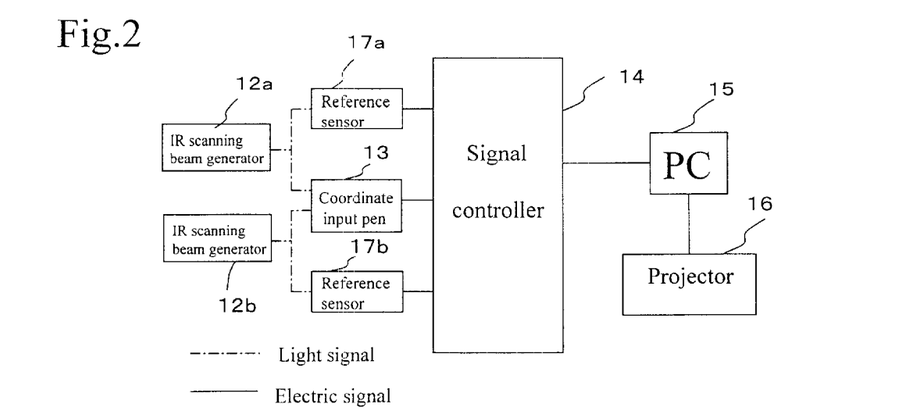
FIG. 2 is a signal flow sheet showing the flow of signals.

FIG. 1 is a block diagram showing an exemplary structure of an IR detection electronic board. FIG. 2 is a signal flow sheet showing the flow of signals. Referring to FIG. 1, the IR detection electronic board is provided with a display panel 11 for displaying character and graphic images, IR scanning beam generators 12a and 12b provided at upper left and upper right corners of the display panel 11, a coordinate input pen 13 for detecting IR beams, a signal controller 14 for determining a position of the coordinate input pen 13, a PC 15 that instructs to display a path of the coordinate input pen, an image displaying projector 16, and reference sensors 17a and 17b for determining reference positions. The display panel 11 may be of any kind such as a rear-projector-type screen, a front-projector-type screen, a plasma display, a flat CRT (cathode-ray tube), or generally used whiteboard or blackboard without a display function.

Figure 3:
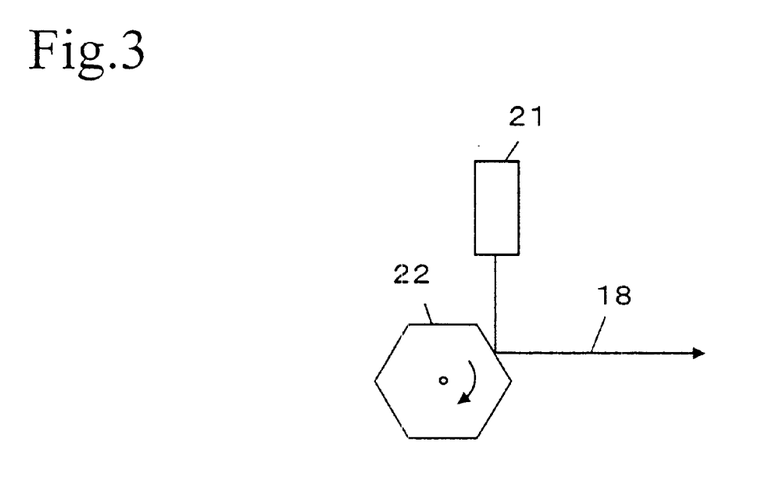
FIG. 3 is a schematic view showing an exemplary structure of an IR scanning beam generator.

FIG. 3 is a schematic view showing an exemplary structure of each of the IR scanning beam generators 12a and 12b. Each of the IR scanning beam generators 12a and 12b may include an IR laser 21 and a polygon mirror 22 which rotates at a predetermined speed for IR beam scanning. The IR scanning beam generators 12a and 12b alternately generate IR beams 18a and 18b (FIG. 1) for pivotally scanning the surface of the display panel 11 at a predetermined angular velocity. Specifically, while an IR beam 18a emitted from one IR scanning beam generator 12a is scanning the surface of the display panel 11, the other IR scanning beam generator 12b does not generate an IR beam 18b, and vice versa. Accordingly, the IR beams 18a and 18b are not incident on the coordinate input pen 13 at the same time.

Figure 4:
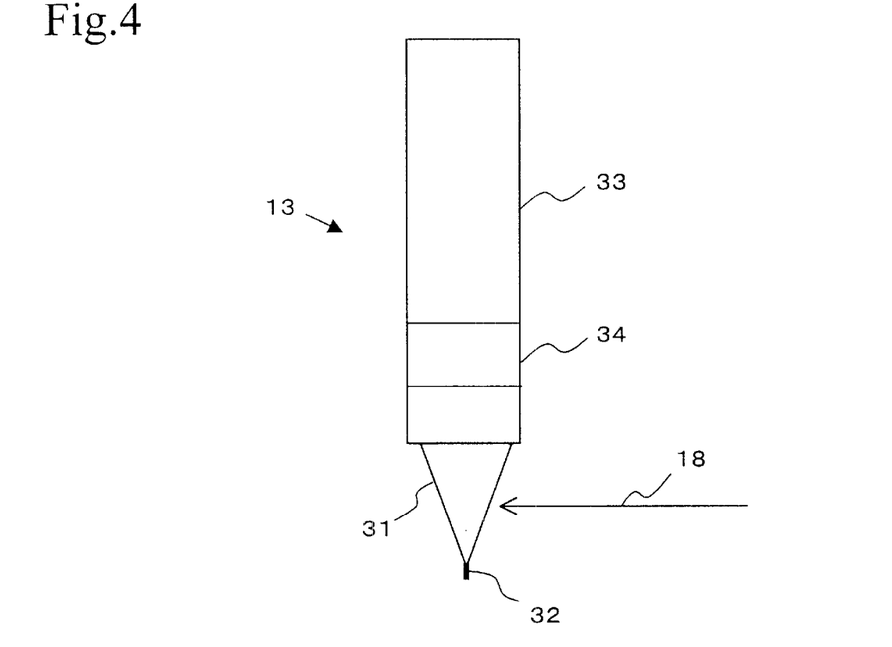
FIG. 4 is a schematic view showing an exemplary structure of a coordinate input pen.

FIG. 4 is a schematic view showing an exemplary structure of the coordinate input pen 13. The coordinate input pen 13 includes a light scattering member 31 for receiving an IR beam 18 scanning over the display panel 11, a felt pen tip 32 at the tip of the light scattering member 31, and a shaft portion 33. Preferably, the light scattering member 31 is about 2 cm long along its axis. The felt pen tip 32 may not be necessary but it is favorable in order to avoid damage of the display panel (screen) 11 caused by the tip of the pen. The shaft portion 33 is provided with a light receiving status displaying member 34 for displaying the light receiving status of the coordinate input pen 13, which is lit when the light scattering member 31 is errorlessly receiving the IR beam 18.

Figure 5:
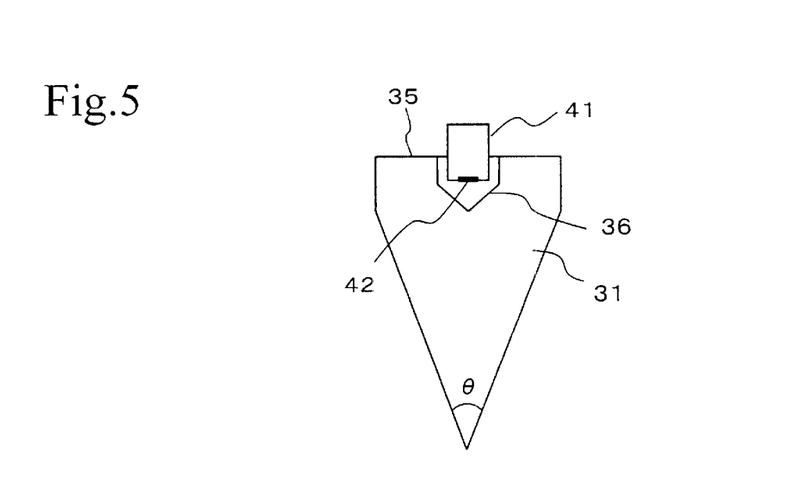
FIG. 5 is a detailed view of a light scattering member.

FIG. 5 is a detailed view of the light scattering member 31. The light scattering member 31 is a conical block made of a material transparent to IR (e.g., plastic such as an acrylic material, or glass). The surface of the light scattering member 31 is made rough so that the IR beam 18 is scattered and as a whole upwardly propagates (along the axial direction) within the light scattering member 31. A plane 35 corresponding to the bottom surface of the corn 31 has a concave 36 into which a photodiode 41 is imbedded with a light receiving plane 42 facing down. The IR beam 18 that is incident on the coordinate input pen 13 is scattered by the rough surface of the conical light scattering member 31 at the end of the pen 13. The scattered light generally propagates upwardly (along the axial direction) within the light scattering member 31 to be received by the light receiving plane 42 of the photodiode 41. In front of the light receiving plane 42, a filter may be provided which only passes IR and blocks visible light, so that the IR beam 18 may accurately be detected without being influenced by the environment (such as the room light) surrounding the coordinate input pen 13.

Figure 6:
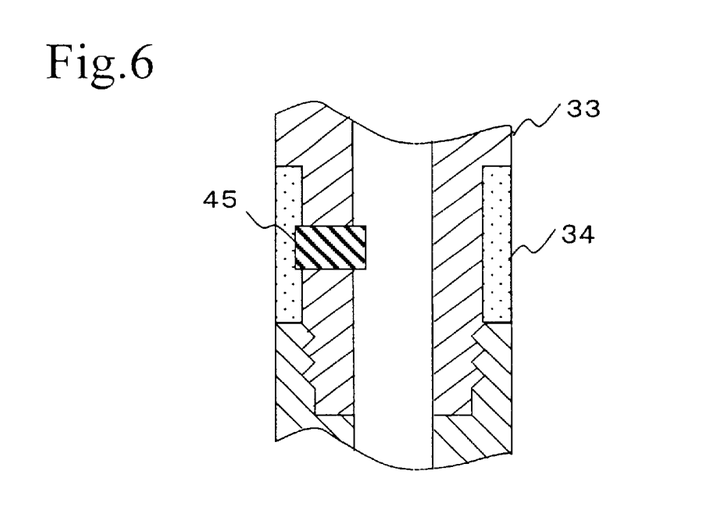
FIG. 6 is a schematic cross-sectional view showing an exemplary structure of a shaft portion of the pen incorporating a displaying member for displaying light receiving status.

FIG. 6 is a schematic cross-sectional view partially showing an exemplary structure of the shaft portion 33 where the light receiving status displaying member 34 is provided. The light receiving status displaying member 34 is, for example, an acrylic resin ring with a rough surface. The internal surface of the status displaying member 34 is partially concaved in which a light emitting diode (hereinafter, simply referred to as "LED") 45 is fixed. When the LED 45 emits light, the ring-shaped status displaying member 34 acts like an optical wave guide and looks as if it has faintly lightened up itself. The emission of the light emitting status displaying member 34 indicates that the light scattering member 31 of the pen 13 is steadily acquiring the IR beam 18. The light receiving status displaying member 34 may be placed anywhere on the shaft portion 33, or the entire shaft portion 33 may be made the status displaying member 34, providing that its light is not incident on the photodiode 41 to cause an error signal.

Figure 7A:
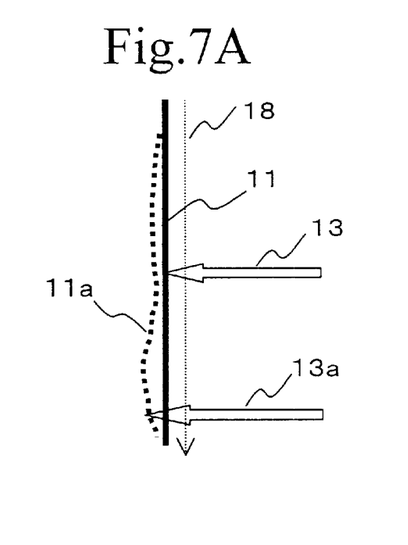
FIGS. 7A and 7B are schematic views for illustrating the status of receiving IR beams.
Figure 7B:
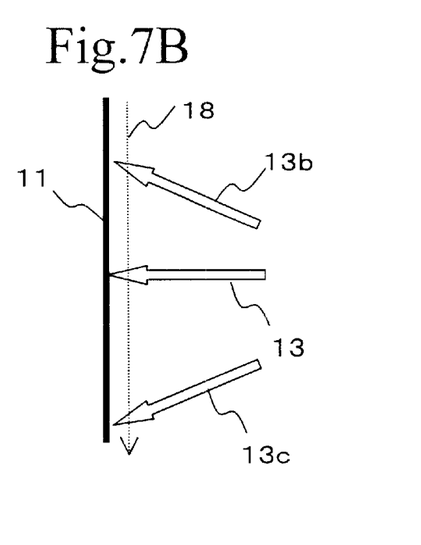

FIGS. 7A and 7B are schematic views for illustrating the status of receiving an IR beam by the coordinate input pen 13. In both figures, the coordinate input pen is represented by an arrow where the head of the arrow is the light scattering member and the tail is the shaft portion. FIG. 7A shows the light receiving status where there is a distortion in the surface of the display panel. FIG. 7B shows the light receiving status where the coordinate input pen 13 is tilted.

The IR beam 18 is designed to be detected when the input pen 13 is in a predetermined positional relationship with the display panel 11. For example, when the display panel 11 is deformed as represented by a broken line 11a in FIG. 7A, the coordinate input pen 13a is mis-aligned with the scanning plane of the IR beam 18. Therefore, the light scattering member (the head of the arrow 13a) is made, for example, about 2 cm long to satisfactorily cope with the possible distortion of the display panel. When the coordinate input pen 13 is tilted as represented by arrows 13b and 13c as shown in FIG. 7B upon use, the light scattering members (heads of the arrows 13b and 13c) of about 2 cm long would still allow the IR beam 18 to be received and detected by the light scattering members (even when the pen is tilted for about 45°).

Inevitably, some degree of distortion or deformation of the display panel (screen), or tilt of the input pen against the display panel are caused when characters or graphics are input in a handwriting fashion using the coordinate input pen. Since the coordinate input pen 13 of the invention incorporates the light scattering member 31, i.e., an IR beam detector, whose length is sufficiently long along the axial direction, the IR beam 18 may steadily be detected so that the path of the coordinate input pen 13 can accurately be reproduced even if the display panel 11 is distorted or deformed, or the input pen 13 is tilted against the display panel.

Figure 8:
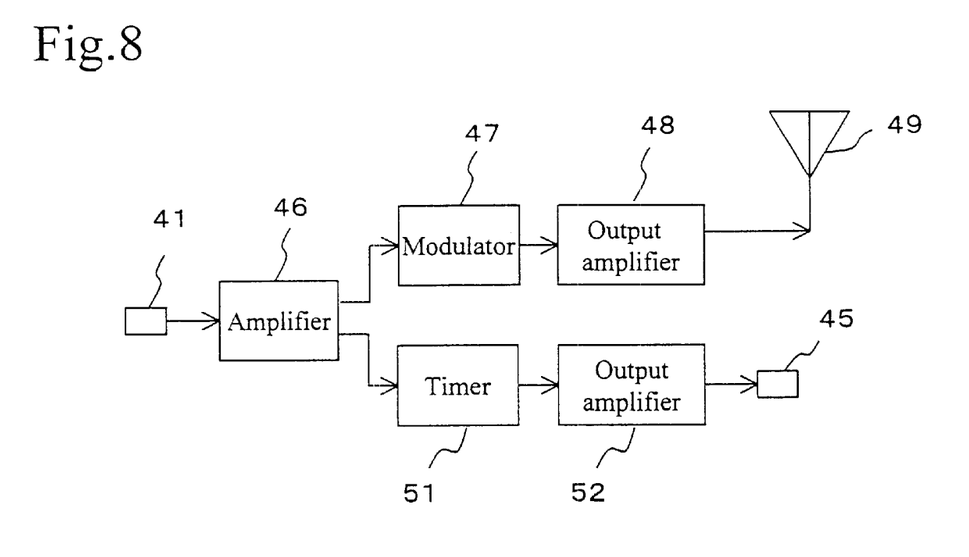
FIG. 8 is a schematic circuit configuration of a signal detection circuit of the coordinate input pen.

FIG. 8 is a circuit configuration of a signal detection circuit configured in the coordinate input pen 13. The figure shows an exemplary circuit for wirelessly transmitting a signal from the coordinate input pen 13 to the signal controller 14 (not shown). The detection signal from the photodiode 41 is amplified with an amplifier 46, modulated with a modulator 47 and amplified with an output amplifier 48 before being transmitted to the signal controller 14 via an antenna 49. In the case where the coordinate input pen 13 uses a wire for transmitting signals, the output from the output amplifier 48 is transmitted to the signal controller 14 via a wire.

The output from the amplifier 46 also operates a timer 51 and generates a dc (direct current) or ac output for a duration of, for example, about 0.5 second, which is then amplified with the output amplifier 52 to initiate the LED 45. Light emission of the LED 45 lights up the light receiving status displaying member 34 which is, for example, made of a ring acrylic resin material with a rough surface, whereby the user may confirm that the IR scanning beam 18 (not shown) has errorlessly been acquired by the coordinate input pen 13. The LED 45 may be capable of emitting light of two colors (red and green). Specifically, the LED 45 emits green light under normal status where the photodiode 41 is alternately receiving the IR scanning beams 18a and 18b generated by the left and right IR scaning beam generators 12a and 12b, and red light under abnormal status where only one of the beams 18a or 18b is continuously being received. Thus, the user will know the status of the coordinate input pen 13 at a glance.

Figure 9A:
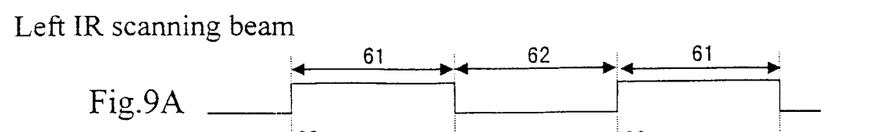
FIGS. 9A–9H are timing charts for illustrating the timing relationships between detection signals from reference sensors and those from the coordinate input pen.
Figure 9B:
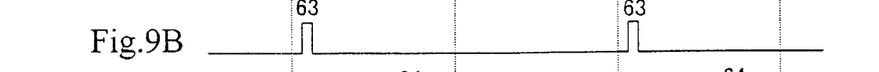
Figure 9C:
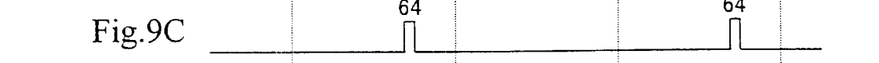
Figure 9D:
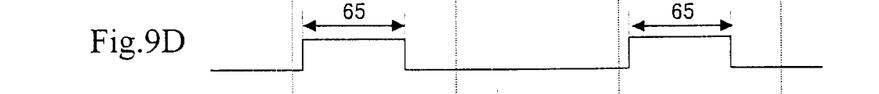
Figure 9E:
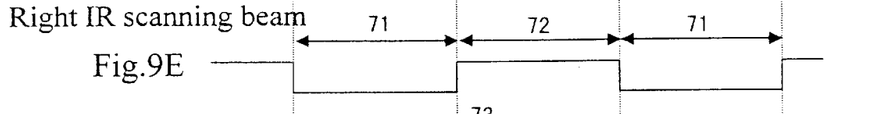
Figure 9F:
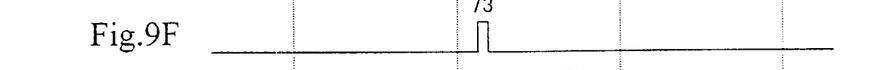
Figure 9G:
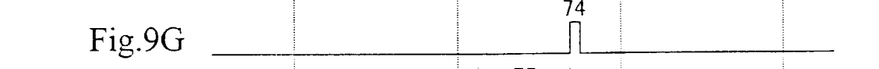
Figure 9H:
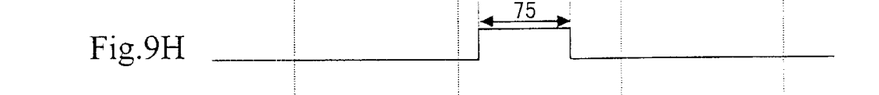

Hereinafter, an example of signal processing of the electronic board system will generally be described with reference to FIGS. 1 and 9–9H, where the coordinate input pen of the invention is used with the IR detection electronic board shown in FIG. 1. FIGS. 9–9H are timing charts for illustrating the timing relationships between detection signals from the reference sensors and a detection signal from the coordinate input pen 13. FIGS. 9A–9D show the beam emitting status of the left IR scanning beam generator 12a; the output from the reference sensor 17a; the detection output from the input pen 13; and detection time, respectively. FIGS. 9E–9H show the beam emitting status of the right IR scanning beam generator 12b; the output from the reference sensor 17b; the detection output from the input pen 13; and detection time, respectively.

The left IR scanning beam generator 12a generates the IR scanning beam 18a during period 61 and pauses the IR scanning during period 62, whereas the right IR scanning beam generator 12b pauses the IR scanning during period 71 and generates the IR scanning beam 18b during period 72. In this manner, the left and right IR scanning beam generators 12a and 12b alternately generates the scanning beams 18a and 18b.

When the IR beam 18a from the left IR scanning beam generator 12a is incident on the reference sensor 17a, the reference sensor 17a outputs a signal 63 (FIG. 9B) to the signal controller 14. Then, the IR beam 18a that continues to scan over the surface of the display panel 11 meets the coordinate input pen 13, upon which the pen 13 generates a light receiving signal 64 (FIG. 9C). The light receiving signal 64 from the coordinate input pen 13 is transmitted via a wire or wirelessly to the signal controller 14. The signal controller 14 counts, with a clock, the time lag 65 (FIG. 9D) between the input of the detection signal 63 from the reference sensor 17a and the input of the detection signal 64 from the coordinate input pen 13, thereby knowing the angle α shown in FIG. 1. Similarly, when the IR beam 18b from the right IR scanning beam generator 12b is incident to the reference sensor 17b, the reference sensor 17b outputs a signal 73 (FIG. 9F) to the signal controller 14. Then, the IR beam 18b that continues to scan over the surface of the display panel 11 meets the coordinate input pen 13, upon which the pen 13 generates a light receiving signal 74 (FIG. 9G). The light receiving signal 74 is transmitted via a wire or wirelessly to the signal controller 14. The signal controller 14 counts the time lag 75 (FIG. 9H) between the inputs of the detection signals 73 and 74 with the clock, thereby knowing the angle β shown in FIG. 1.

Based on the angles α and β, the signal controller 14 calculates the position coordinates (x, y) of the coordinate input pen 13 where the origin of coordinates (0, 0) lies at the lower left corner of the display panel 11, and outputs accurate positional information of the pen to the PC 15. Finally, the PC 15 displays the location or the path of the coordinate input pen 13 on the display panel 11 with the projector 16. The coordinates (x, y) of the input pen 13 is given based on the following equations:

$$x = a \cdot \tan\beta / (\tan\alpha + \tan\beta)$$

$$y = b - x \cdot \tan\alpha$$

where, a is the distance between the left and right IR beam generators 12a and 12b, and b is the distance between the lower left corner of the display panel 11 (i.e., the origin of the coordinates) and the left IR scanning beam generator 12a.

Figure 10:
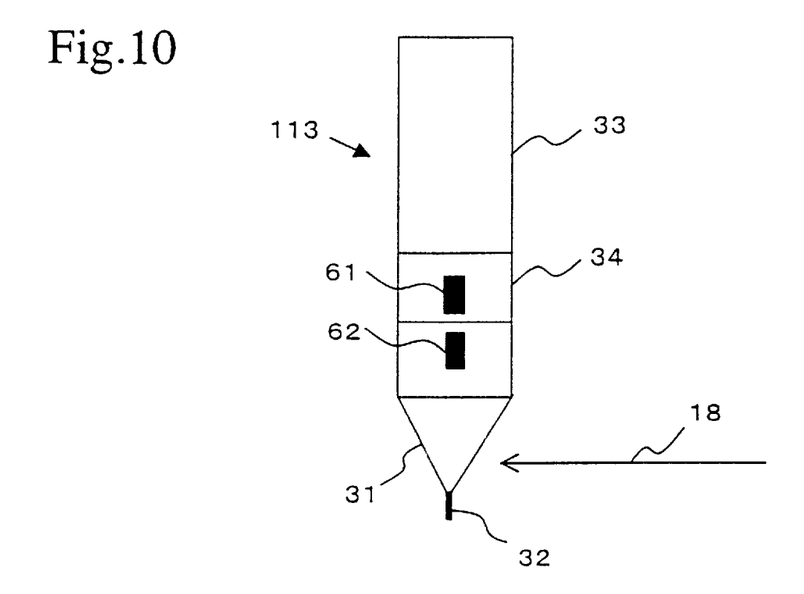
FIG. 10 is a schematic view showing an exemplary structure of a coordinate input pen with mouse buttons.

FIG. 10 is a schematic view showing an exemplary structure of a coordinate input pen 113 with mouse buttons. In FIG. 10, the same reference numerals as those in FIG. 4 denote the same components and the details thereof are omitted. The coordinate input pen 113 is provided with two buttons 61 and 62. These buttons 61 and 62 may be used to act as a "left click" button, a "right click" button or a "double click" button of a mouse of a PC. Alternatively, other key functions such as "enter" of a PC keyboard may be allocated to these buttons.

Figure 11:
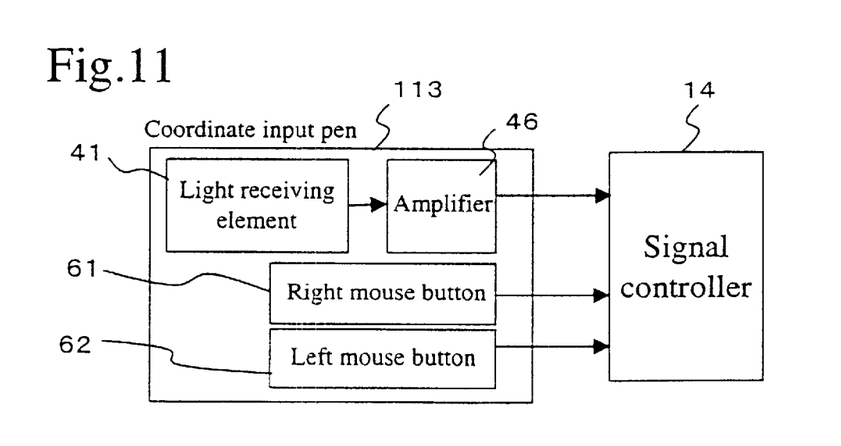
FIG. 11 is a signal flow sheet showing the flow of signals of the mouse buttons.

FIG. 11 is a signal flow sheet showing the flow of the signals of the mouse buttons 61 and 62 showing an exemplary case where the coordinate input pen 113 and the signal controller 14 are connected to each other via a wire. A signal from the right mouse button 61 or the left mouse button 62 is input into the signal controller 14 in parallel with the light detection signal amplified with the amplifier 46. When the coordinate input pen 113 and the signal controller 14 are wirelessly connected to each other (via radio wave), an output signal from the mouse buttons 61 or 62 is input into the modulator 47 shown in FIG. 8 together with the light detection signal from the photodiode 41. The light detection signal and the mouse button signals are separately processed at the signal controller 14.

Figure 12A:
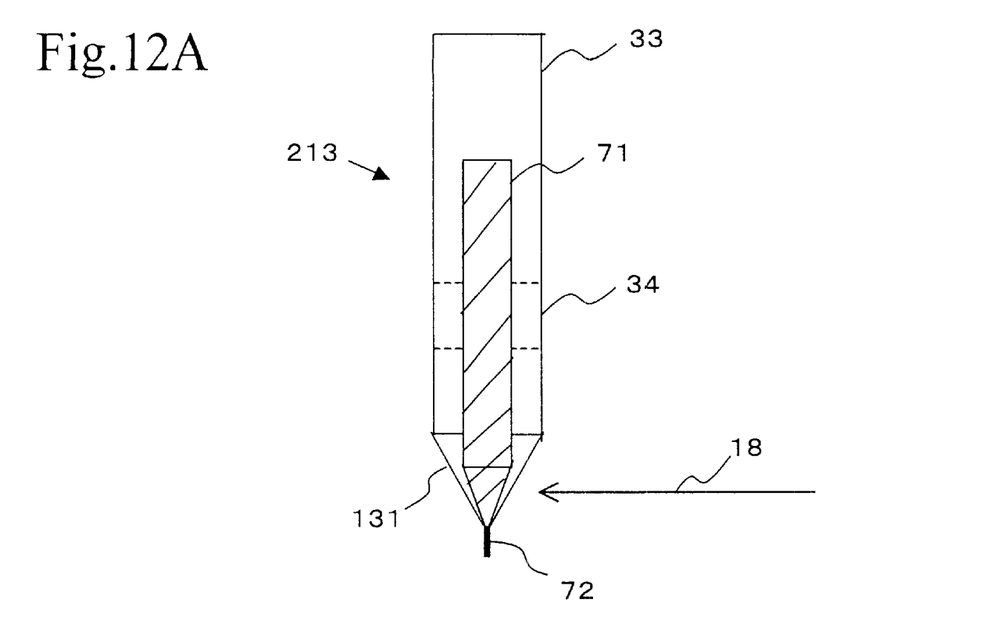
FIGS. 12A and 12B are cross-sectional views showing an exemplary structure of a coordinate input pen integrated with a writing tool.
Figure 12B:
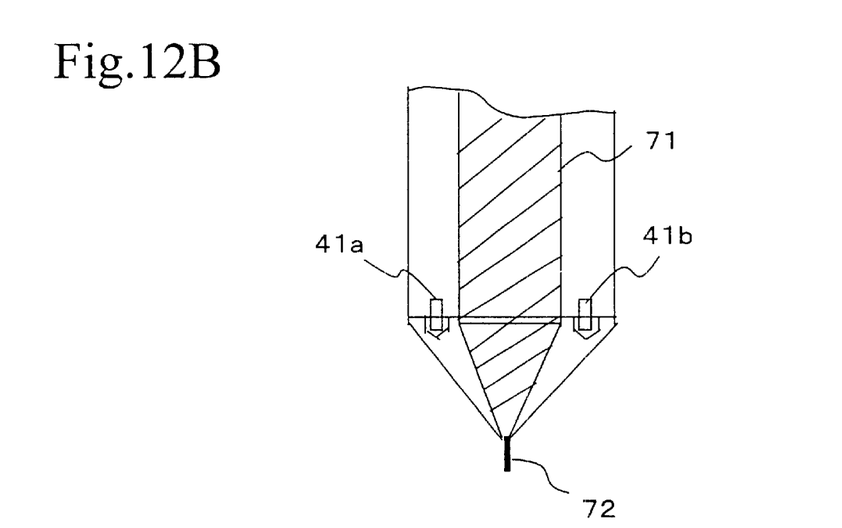

FIGS. 12A and 12B are schematic cross-sectional views showing an exemplary structure of a coordinate input pen 213 integrated with a writing tool 71. FIG. 12A shows a general structure of the coordinate input pen 213 and FIG. 12B is an enlarged cross-sectional view showing the tip of the pen 213. In FIGS. 12A and 12B, the same reference numerals as those in FIG. 4 denote the same components and the details thereof are omitted. The writing tool 71 may be, for example, a water marker, a chalk, a pencil, or a crayon. The pen 213 shown in FIGS. 12A and 12B incorporates a water marker 71 with a felt tip 72 impregnated with water ink, which can be used to write or draw on a plane like a whiteboard.

A light scattering member 131 has a cavity into which the water marker 71 is inserted and fixed while exposing the tip 72 outside. According to this structure, a photodiode for detecting light cannot be provided along the axis of the light scattering member 131 since the center of the member 131 is occupied by the marker 71. As a result, the photodiode has to be provided asymmetrically with respect to the center of the scattering member 131, which may cause unsteady detection depending upon, for example, the attitude of the pen 213 toward the IR scanning beam. Moreover, this would deteriorate the detection efficiency of the IR beam scattered within the light scattering member 131.

According to this example, a pair of photodiodes 41a and 41b are provided in the light scattering member 131 in a symmetrical manner with respect to the center axis of the pen, on a plane corresponding to a bottom surface of the conical an light scattering member 131. The outputs from the photodiodes 41a and 41b are added for amplification, thereby preventing a decrease in the quantity of light received by the photodiode and unsteady sensitivity due to attitude and direction of the pen. The number of photodiodes may be three or more. The coordinate input pen 213 is provided with a cap to cover the pen tip to prevent evaporation of the ink.

According to the present invention, a coordinate input system and a coordinate input pen employing an IR detection system are provided which allow steady detection of the position of the pen even under the circumstances where the display panel is distorted or deformed, or where the coordinate input pen is tilted.

The present invention also provides an electronic board and an electronic board system for steadily displaying the path of the coordinate input pen.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

All publications, patents, and patent applications cited herein are incorporated herein by reference in their entirety.

What is claimed is:

1. A coordinate input pen for detecting infrared beams and outputting infrared beam detection signals, wherein the infrared beams are emitted from two separate pivotally scanning positions over a plane parallel to a surface of a display panel, the coordinate pen comprising:
   a shaft portion;
   a transparent conical light scattering member with a rough surface, which is placed at the end of the shaft portion;
   a light receiving element for detecting at least two infrared beams scattered within the transparent conical light scattering member by the rough surface;
   a signal generator for generating infrared detection signals upon detecting said at least two infrared beams; and,
   an element to transmit infrared beam detection signals to a controller.

2. The coordinate input pen of claim 1, wherein the shaft portion comprises a displaying member which visually displays a status of receiving the infrared beam.

3. The coordinate input pen of claim 1, wherein the pen comprises a function of producing signals corresponding to a left click, a right click, or a double click of a mouse or a signal corresponding to a key input of a keyboard of a computer.

4. A coordinate input pen according to claim 1, comprising a writing tool for leaving a path written on the display panel while outputting coordinates of the pen.

5. A coordinate input system comprising:
   a first infrared scanning beam generator and a second infrared scanning beam generator which alternately generate infrared scanning beams;
   a first reference sensor for generating a first reference signal upon detecting an infrared scanning beam generated by the first infrared scanning beam generator;
   a second reference sensor for generating a second reference signal upon detecting an infrared scanning beam generated by the second infrared scanning beam generator;
   the coordinate input pen of claim 1 which generates a first detection signal upon detecting the first infrared scanning beam from the first infrared scanning beam generator, and generates a second detection signal upon detecting the second infrared scanning beam from the second infrared scanning beam generator; and
   a signal controller for receiving the first reference signal from the first reference sensor, the second reference signal from the second reference sensor and the first and the second detection signals from the coordinate input pen, thereby outputting a position coordinates signal indicating coordinates of the coordinate input pen.

6. An electronic board system comprising:
   a display panel;
   first and second infrared scanning beam generators which are separately placed at the periphery of the display panel and which alternately generate infrared scanning beams which rotate parallel to the surface of the display panel;
   a first reference sensor placed at the periphery of the display panel, for generating a first reference signal upon detecting an infrared scanning beam generated by the first infrared scanning beam generator;
   a second reference sensor placed at the periphery of the display panel, for generating a second reference signal upon detecting an infrared scanning beam generated by the second infrared scanning generator;
   the coordinate input pen of claim 1 which generates a first detection signal upon detecting the first infrared scanning beam from the first infrared scanning beam generator, and generates a second detection signal upon detecting the second infrared scanning beam from the second infrared scanning beam generator; and
   a signal controller, wherein the signal controller is capable of determining the position of the coordinate input pen by receiving (i) the first reference signal from the first reference sensor, (ii) the second reference signal from the second reference sensor and (iii) the first and second detection signals from the coordinate input pen, calculating the position of the coordinate input pen based on (i), (ii) and (iii), and outputting the position of the coordinate input pen in the form of a position coordinates signal to a computer.

7. The electronic board system according to claim 6, comprising:
   a computer for receiving a position coordinates signal from the signal controller; and
   an image displaying means connected to the computer for displaying a mark on the display panel at a position assigned by the position coordinates signal indicating coordinates of the coordinate input pen.

8. A coordinate input system comprising:

a first infrared scanning beam generator and a second infrared scanning beam generator which alternately generate infrared scanning beams;

a first reference sensor for generating a first reference signal upon detecting an infrared scanning beam generated by the first infrared scanning beam generator;

a second reference sensor for generating a second reference signal upon detecting an infrared scanning beam generated by the second infrared scanning beam generator;

the coordinate input pen of claim 2 which generates a first detection signal upon detecting the first infrared scanning beam from the first infrared scanning beam generator, and generates a second detection signal upon detecting the second infrared scanning beam from the second infrared scanning beam generator; and a signal controller for receiving the first reference signal from the first reference sensor, the second reference signal from the second reference sensor and the first and the second detection signals from the coordinate input pen, thereby outputting a position coordinates signal indicating coordinates of the coordinate input pen.

9. A coordinate input system comprising:

a first infrared scanning beam generator and a second infrared scanning beam generator which alternately generate infrared scanning beams;

a first reference sensor for generating a first reference signal upon detecting an infrared scanning beam generated by the first infrared scanning beam generator;

a second reference sensor for generating a second reference signal upon detecting an infrared scanning beam generated by the second infrared scanning beam generator;

the coordinate input pen of claim 3 which generates a first detection signal upon detecting the first infrared scanning beam from the first infrared scanning beam generator, and generates a second detection signal upon detecting the second infrared scanning beam from the second infrared scanning beam generator; and a signal controller for receiving the first reference signal from the first reference sensor, the second reference signal from the second reference sensor and the first and the second detection signals from the coordinate input pen, thereby outputting a position coordinates signal indicating coordinates of the coordinate input pen.

10. An electronic board comprising:

a display panel;

first and second infrared scanning beam generators which are separately placed at the periphery of the display panel and which alternately generate infrared scanning beams which rotate parallel to the surface of the display panel;

a first reference sensor placed at the periphery of the display panel, for generating a first reference signal upon detecting an infrared scanning beam generated by the first infrared scanning beam generator;

a second reference sensor placed at the periphery of the display panel, for generating a second reference signal upon detecting an infrared scanning beam generated by 60 the second infrared scanning generator;

the coordinate input pen of claim 2 which generates a first detection signal upon detecting the first infrared scanning beam from the first infrared scanning beam generator, and generates a second detection signal upon detecting the second infrared scanning beam from the second infrared scanning beam generator; and a signal controller for receiving the first reference signal from the first reference sensor, the second reference signal from the second reference sensor, and the first and second detection signals from the coordinate input pen, thereby outputting a position coordinates signal indicating coordinates of the coordinate input pen.

11. An electronic board comprising:

a display panel;

first and second infrared scanning beam generators which are separately placed at the periphery of the display panel and which alternately generate infrared scanning beams which rotate parallel to the surface of the display panel;

a first reference sensor placed at the periphery of the display panel, for generating a first reference signal upon detecting an infrared scanning beam generated by the first infrared scanning beam generator;

a second reference sensor placed at the periphery of the display panel, for generating a second reference signal upon detecting an infrared scanning beam generated by the second infrared scanning generator;

the coordinate input pen of claim 3 which generates a first detection signal upon detecting the first infrared scanning beam from the first infrared scanning beam generator, and generates a second detection signal upon detecting the second infrared scanning beam from the second infrared scanning beam generator; and a signal controller for receiving the first reference signal from the first reference sensor, the second reference signal from the second reference sensor, and the first and second detection signals from the coordinate input pen, thereby outputting a position coordinates signal indicating coordinates of the coordinate input pen.

12. The electronic board system according to claim 10, comprising:

a computer for receiving a position coordinates signal from the signal controller; and an image displaying means connected to the computer for displaying a mark on the display panel at a position assigned by the position coordinates signal indicating coordinates of the coordinate input pen.

13. The electronic board system according to claim 11, comprising:

a computer for receiving a position coordinates signal from the signal controller; and an image displaying means connected to the computer for displaying a mark on the display panel at a position assigned by the position coordinates signal indicating coordinates of the coordinate input pen.

14. The coordinate input pen of claim 1, wherein the pen comprises buttons to produce signals corresponding to a left click, a right click, or a double click of a mouse or a signal corresponding to a key input of a keyboard of a computer.

15. The coordinate input pen of claim 1, wherein the coordinate input pen transmits an infrared beam detection signal to a controller wirelessly or via a wire.

16. The coordinate input pen of claim 1 further comprising a felt pen tip.

17. The coordinate input pen of claim 4, wherein the writing tool comprises a water marker, a chalk, a pencil or a crayon.

18. The electronic board system of claim 6, wherein the display panel comprises a rear projector type screen, a front projector type screen, a plasma display, a flat cathode ray tube, a whiteboard or a blackboard.

* * * * *